US009082224B2

(12) United States Patent
Birtwistle et al.

(10) Patent No.: US 9,082,224 B2
(45) Date of Patent: Jul. 14, 2015

(54) SYSTEMS AND METHODS 2-D TO 3-D CONVERSION USING DEPTH ACCESS SEGIMENTS TO DEFINE AN OBJECT

(75) Inventors: Steven Birtwistle, Calgary (CA);
Natascha Wallner, Calgary (CA);
Gregory R. Keech, Calgary (CA);
Christopher Levi Simmons, Calgary (CA); David A. Spooner, Calgary (CA);
Danny D. Lowe, Calgary (CA);
Jonathan Adelman, Calgary (CA)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/548,723

(22) Filed: Jul. 13, 2012

(65) Prior Publication Data
US 2012/0275689 A1 Nov. 1, 2012

Related U.S. Application Data

(63) Continuation of application No. 12/046,272, filed on Mar. 11, 2008, now Pat. No. 8,274,530.

(60) Provisional application No. 60/894,450, filed on Mar. 12, 2007.

(51) Int. Cl.
*G06T 1/00* (2006.01)
*G06T 15/20* (2011.01)
*G06T 11/00* (2006.01)
*G06T 5/00* (2006.01)
*G06T 5/20* (2006.01)

(52) U.S. Cl.
CPC .............. *G06T 15/205* (2013.01); *G06T 5/005* (2013.01); *G06T 5/20* (2013.01); *G06T 11/001* (2013.01); *G06T 2207/10024* (2013.01)

(58) Field of Classification Search
None
See application file for complete search history.

(56) References Cited

U.S. PATENT DOCUMENTS

| 4,689,616 | A | 8/1987 | Goude et al. |
| 4,925,294 | A | 5/1990 | Geshwind et al. |
| 5,323,007 | A | 6/1994 | Wernick et al. |
| 5,614,941 | A | 3/1997 | Hines |
| 5,621,815 | A | 4/1997 | Talukdar et al. |
| 5,684,943 | A | 11/1997 | Abraham et al. |

(Continued)

FOREIGN PATENT DOCUMENTS

| EP | 1308902 A2 | 5/2003 |
| EP | 1141893 | 4/2005 |

(Continued)

OTHER PUBLICATIONS

U.S. Appl. No. 10/946,955, filed Sep. 22, 2004, Spooner et al.

(Continued)

*Primary Examiner* — Jwalant Amin
(74) *Attorney, Agent, or Firm* — McDermott Will & Emery LLP

(57) ABSTRACT

The present invention is directed to systems and methods for controlling 2-D to 3-D image conversion. The system and method includes receiving an image and masking the objects in the image using segmentation layers Each segmentation layer can have weighted values for static and dynamic features. Iterations are used to form the final image which, if desired, can be formed using less than all of the segmentation layers. A final iteration can be run with the weighted values equal for static and dynamic features.

25 Claims, 4 Drawing Sheets

(56) References Cited

U.S. PATENT DOCUMENTS

| | | |
|---|---|---|
| 5,729,471 A | 3/1998 | Jain et al. |
| 5,742,291 A | 4/1998 | Palm |
| 5,748,199 A | 5/1998 | Palm |
| 5,805,117 A | 9/1998 | Mazurek et al. |
| 5,969,722 A | 10/1999 | Palm |
| 5,977,978 A | 11/1999 | Carey et al. |
| 5,990,900 A | 11/1999 | Seago |
| 6,009,189 A | 12/1999 | Schaack |
| 6,016,150 A | 1/2000 | Lengyel et al. |
| 6,031,564 A | 2/2000 | Ma et al. |
| 6,049,628 A | 4/2000 | Chen et al. |
| 6,061,083 A | 5/2000 | Aritake et al. |
| 6,128,132 A | 10/2000 | Wieland et al. |
| 6,134,345 A | 10/2000 | Berman et al. |
| 6,134,346 A | 10/2000 | Berman et al. |
| 6,151,404 A | 11/2000 | Pieper |
| 6,204,912 B1 | 3/2001 | Tsuchiya et al. |
| 6,208,347 B1 | 3/2001 | Migdal et al. |
| 6,208,360 B1 | 3/2001 | Doi et al. |
| 6,215,516 B1 | 4/2001 | Ma et al. |
| 6,226,004 B1 | 5/2001 | Nishihara |
| 6,278,460 B1 | 8/2001 | Myers et al. |
| 6,320,984 B1 | 11/2001 | Shigeta |
| 6,333,749 B1 | 12/2001 | Reinhardt et al. |
| 6,342,887 B1 | 1/2002 | Munroe |
| 6,359,630 B1 | 3/2002 | Morse et al. |
| 6,429,875 B1 | 8/2002 | Pettigrew et al. |
| 6,434,278 B1 | 8/2002 | Hashimoto |
| 6,456,745 B1 | 9/2002 | Bruton et al. |
| 6,466,205 B2 | 10/2002 | Simpson et al. |
| 6,477,267 B1 | 11/2002 | Richards et al. |
| 6,504,569 B1 | 1/2003 | Jasinschi et al. |
| 6,549,200 B1 | 4/2003 | Mortlock et al. |
| 6,580,821 B1 | 6/2003 | Roy |
| 6,588,908 B2 | 7/2003 | Shimizu |
| 6,603,504 B1 | 8/2003 | Son et al. |
| 6,674,925 B1 | 1/2004 | Schoepflin et al. |
| 6,714,196 B2 | 3/2004 | McCormack et al. |
| 6,760,020 B1 | 7/2004 | Uchiyama et al. |
| 6,867,750 B2 | 3/2005 | Noro |
| 6,867,787 B2 | 3/2005 | Shimizu et al. |
| 6,914,599 B1 | 7/2005 | Rowe et al. |
| 6,956,576 B1 | 10/2005 | Deering et al. |
| 6,989,840 B1 | 1/2006 | Everitt et al. |
| 7,053,904 B1 | 5/2006 | Kirk et al. |
| 7,102,652 B2 | 9/2006 | O'Donnell et al. |
| 7,116,323 B2 | 10/2006 | Kaye et al. |
| 7,148,907 B2 | 12/2006 | Smith et al. |
| 7,181,081 B2 | 2/2007 | Sandrew |
| 7,289,662 B2 | 10/2007 | Keaton et al. |
| 7,344,256 B2 | 3/2008 | Watanabe et al. |
| 7,453,456 B2 | 11/2008 | Petrov et al. |
| 7,453,489 B2 | 11/2008 | Ezawa |
| 7,474,803 B2 | 1/2009 | Petrov et al. |
| 7,508,977 B2 | 3/2009 | Lyons et al. |
| 7,542,034 B2 | 6/2009 | Spooner et al. |
| 7,616,834 B2 | 11/2009 | Kramer et al. |
| 7,643,966 B2 | 1/2010 | Adachi et al. |
| 7,706,603 B2 | 4/2010 | Najafi et al. |
| 7,853,085 B2 | 12/2010 | Miller |
| 7,889,913 B2 | 2/2011 | Wells |
| 7,907,774 B2 | 3/2011 | Parr et al. |
| 7,907,793 B1 | 3/2011 | Sandrew |
| 7,965,892 B2 * | 6/2011 | Kanatsu .................. 382/176 |
| 8,055,046 B2 | 11/2011 | Feilkas et al. |
| 8,217,931 B2 | 7/2012 | Lowe et al. |
| 8,274,530 B2 | 9/2012 | Birtwistle et al. |
| 2001/0031073 A1 | 10/2001 | Tajima |
| 2001/0040570 A1 | 11/2001 | Light et al. |
| 2002/0030675 A1 | 3/2002 | Kawai |
| 2002/0122113 A1 | 9/2002 | Foote |
| 2002/0122585 A1 | 9/2002 | Swift et al. |
| 2002/0126117 A1 | 9/2002 | Grzeszczuk et al. |
| 2002/0126396 A1 | 9/2002 | Dolgoff |
| 2002/0164067 A1 | 11/2002 | Askey et al. |
| 2002/0186348 A1 | 12/2002 | Covannon et al. |
| 2003/0021453 A1 | 1/2003 | Weise et al. |
| 2003/0058242 A1 | 3/2003 | Redlich |
| 2003/0090482 A1 | 5/2003 | Rousso et al. |
| 2003/0099397 A1 | 5/2003 | Matsugu et al. |
| 2003/0161526 A1 | 8/2003 | Jupiter et al. |
| 2003/0164893 A1 | 9/2003 | Mayhew |
| 2003/0179923 A1 | 9/2003 | Xiong et al. |
| 2003/0184730 A1 | 10/2003 | Price |
| 2003/0202120 A1 | 10/2003 | Mack |
| 2003/0210329 A1 | 11/2003 | Aagaard et al. |
| 2003/0214533 A1 | 11/2003 | Cull et al. |
| 2004/0002642 A1 | 1/2004 | Dekel et al. |
| 2004/0081354 A1 | 4/2004 | Mojsilovic et al. |
| 2004/0160512 A1 | 8/2004 | Lee et al. |
| 2004/0183798 A1 | 9/2004 | Clavadetscher |
| 2004/0218788 A1 | 11/2004 | Geng |
| 2004/0247174 A1 | 12/2004 | Lyons et al. |
| 2004/0258309 A1 | 12/2004 | Keaton et al. |
| 2004/0264806 A1 | 12/2004 | Herley |
| 2005/0052452 A1 | 3/2005 | Baumberg |
| 2005/0094879 A1 | 5/2005 | Harville |
| 2005/0117215 A1 | 6/2005 | Lange |
| 2005/0140670 A1 | 6/2005 | Wu et al. |
| 2005/0151751 A1 | 7/2005 | Hong et al. |
| 2005/0166163 A1 | 7/2005 | Chang et al. |
| 2005/0207647 A1 | 9/2005 | Maeda |
| 2005/0216237 A1 | 9/2005 | Adachi et al. |
| 2005/0223337 A1 | 10/2005 | Wheeler et al. |
| 2005/0231505 A1 | 10/2005 | Kaye et al. |
| 2005/0243088 A1 | 11/2005 | Lengyel |
| 2006/0023197 A1 | 2/2006 | Joel |
| 2006/0033762 A1 | 2/2006 | Card et al. |
| 2006/0044527 A1 | 3/2006 | Watanabe et al. |
| 2006/0055699 A1 | 3/2006 | Perlman et al. |
| 2006/0067574 A1 | 3/2006 | Perlmutter et al. |
| 2006/0088203 A1 | 4/2006 | Boca et al. |
| 2006/0114253 A1 | 6/2006 | Zitnick, III et al. |
| 2006/0126919 A1 | 6/2006 | Kitaura et al. |
| 2006/0140473 A1 | 6/2006 | Brooksby et al. |
| 2006/0153454 A1 | 7/2006 | Grimme |
| 2006/0171584 A1 | 8/2006 | Sandrew |
| 2006/0192776 A1 | 8/2006 | Nomura et al. |
| 2006/0221248 A1 | 10/2006 | McGuire et al. |
| 2006/0232583 A1 | 10/2006 | Petrov et al. |
| 2007/0009179 A1 | 1/2007 | Easwar |
| 2007/0013813 A1 | 1/2007 | Sun et al. |
| 2007/0024635 A1 | 2/2007 | Jojic et al. |
| 2007/0031037 A1 | 2/2007 | Blake et al. |
| 2007/0081714 A1 | 4/2007 | Wallack et al. |
| 2007/0097120 A1 | 5/2007 | Wheeler et al. |
| 2007/0103459 A1 | 5/2007 | Stoval et al. |
| 2007/0153122 A1 | 7/2007 | Ayite et al. |
| 2007/0192757 A1 | 8/2007 | Emi et al. |
| 2007/0253618 A1 | 11/2007 | Kim et al. |
| 2007/0258632 A1 | 11/2007 | Friedman et al. |
| 2007/0294270 A1 | 12/2007 | Gregory et al. |
| 2007/0296721 A1 | 12/2007 | Chang et al. |
| 2008/0018732 A1 | 1/2008 | Moller |
| 2008/0056716 A1 | 3/2008 | Fujikawa |
| 2008/0056719 A1 | 3/2008 | Bernard et al. |
| 2008/0074438 A1 | 3/2008 | Maillot |
| 2008/0095416 A1 | 4/2008 | Jeung et al. |
| 2008/0099682 A1 | 5/2008 | Gordon et al. |
| 2008/0111816 A1 | 5/2008 | Abraham et al. |
| 2008/0123937 A1 | 5/2008 | Arias Estrada et al. |
| 2008/0225040 A1 | 9/2008 | Simmons et al. |
| 2008/0225042 A1 | 9/2008 | Birtwistle et al. |
| 2008/0225045 A1 | 9/2008 | Birtwistle et al. |
| 2008/0225059 A1 | 9/2008 | Lowe et al. |
| 2008/0226123 A1 | 9/2008 | Birtwistle et al. |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0228449 A1 | 9/2008 | Birtwistle et al. |
| 2008/0246836 A1 | 10/2008 | Lowe et al. |
| 2008/0259073 A1 | 10/2008 | Lowe et al. |
| 2008/0259075 A1 | 10/2008 | Fowler et al. |

(56) References Cited

U.S. PATENT DOCUMENTS

| | | | |
|---|---|---|---|
| 2009/0116732 | A1 | 5/2009 | Zhou et al. |
| 2011/0164109 | A1 | 7/2011 | Baldridge et al. |
| 2011/0169914 | A1 | 7/2011 | Lowe et al. |
| 2011/0227917 | A1 | 9/2011 | Lowe et al. |
| 2012/0032948 | A1 | 2/2012 | Lowe et al. |
| 2012/0274638 | A1 | 11/2012 | Birtwistle et al. |
| 2012/0275652 | A1 | 11/2012 | Birtwistle et al. |
| 2012/0275687 | A1 | 11/2012 | Lowe et al. |
| 2012/0280989 | A1 | 11/2012 | Birtwistle et al. |
| 2012/0313940 | A1 | 12/2012 | Birtwistle et al. |

FOREIGN PATENT DOCUMENTS

| | | |
|---|---|---|
| GB | 2365243 A | 2/2002 |
| JP | 07230556 | 8/1995 |
| JP | 9-091436 | 4/1997 |
| JP | 9-186957 | 7/1997 |
| JP | 9-237346 | 9/1997 |
| JP | 10-111934 | 4/1998 |
| JP | 2000-194863 A | 7/2000 |
| JP | 2000-353244 A | 12/2000 |
| WO | WO-2007/130122 | 11/2007 |
| WO | WO-2007/142643 | 12/2007 |
| WO | WO-2007/142649 | 12/2007 |
| WO | WO-2007/148219 | 12/2007 |
| WO | WO-2008/051231 | 5/2008 |
| WO | WO-2008/060289 | 5/2008 |
| WO | WO-2008/063167 | 5/2008 |
| WO | WO-2008/063170 | 5/2008 |
| WO | WO-2008/112804 | 9/2008 |
| WO | WO-2008/112808 | 9/2008 |

OTHER PUBLICATIONS

U.S. Appl. No. 11/627,414, filed Jan. 26, 2007, Spooner et al.
Jianbing Huang; Chia-Hsiang Menq;, "Automatic data segmentation for geometric featrure extraction from unorganized 3-D coordinate points," Robotics and Automation, IEEE Transactions on, vol. 17, No. 3, pp. 268-279, Jun. 2001.
Moustakas, K.; Tzovaras, D.; Strintzis, M.G.;, "Stereoscopic video generation based on efficient layered structure and motion estimation from a monoscopic image sequence," Circuits and Systems for Video Technology, IEEE Transactions on, vol. 15, No. 8, pp. 1065-1073, Aug. 2005.
Andre Meyer, Philippe Marin, Segmentation of 3D triangulated data points using edges constructed with a C1 discontinuous surface fitting, Computer-Aided Design, vol. 36, Issue 13, Nov. 2004, pp. 1327-1336.
International Search Report and Written Opinion issued for PCT/US2005/031664, dated Apr. 6, 2006.
Chun-Jen Tsai et al., "Model-Based Synthetic View Generation from a Monocular Video Sequence", Image Processing, 1997 Proceedings, IEEE, vol. 1 Oct. 26, 1997, pp. 444-447.
Wurmlin S. et al., "3D Video Fragments: Dynamic point samples for Real-Time Free-Viewpoint Video", Computers and Graphics Elsevier UK, vol. 28 Feb. 1, 2004, pp. 3-14.
Labatut, Patrick, et al. "Efficient Multi-View Reconstruction of Large-Scale Scenes Using Interest Points, Triangulation and Graph Cuts," Computer Vision, 2007. ICCV 2007.IEEE 11th International Conference on Oct. 14-21, 2007, pp. 108.

M. Pollefeys, et al., "Visual Modeling with a Hand-Held Camera," International Journal of Computer Vision, Sep. 2004, pp. 207-232, vol. 59, No. 3, Kluwer Academic Publishers, Manufactured in The Netherlands.
International Search Report and Written Opinion issued for PCT/US2008/056719; Dated: Sep. 3, 2008; 9 Pages.
International Search Report and Written Opinion issued for PCT/US2008/056697; Dated: Sep. 4, 2008; 10 Pages.
International Search Report and Written Opinion issued for PCT/US2008/056716; Dated: Aug. 22, 2008; 8 Pages.
International Search Report and Written Opinion issued for PCT/US2008/056388; Dated: Aug. 20, 2008; 9 Pages.
International Search Report and Written Opinion issued for PCT/US2008/056384; Dated Aug. 20, 2008; 11 Pages.
Alexandre X. Falcao et al.; "User-Steered Image Segmentation Paradigms: Live Wire and Live Lane"; Graphical Models and Image Processing, vol. 60, Issue 4 (Jul. 1998); pp. 233-260.
Tony F. Chan et al; "Active Contours Without Edges"; IEEE Transactions on Image Processing; vol. 10, Issue 2, Feb. 2001; pp. 266-277.
G. Vosselman et al.; "Recognising Structure in Laser Scanner Point Clouds"; IAPRS (www.itc.nl/personal/vosselman/papers/vosselman2004.natscan.pdf).
Tamal K. Dey et al.; "Shape Segmentation and Matching from Noisy Point Clouds"; Proc. Eurographics Sympos. Point-Based Graphics (2004), Marc Alexa and S. Rusinkiewicz (eds) (2004), pp. 193-199.
Tamal K. Dey et al.; "Shape Segmentation and Matching with Flow Discretization"; Proc. Workshop Algorithms Data Structures (WADS 03), LNCS 2748, F. Dehen, J.R. Sack, M. Smid Eds.
International Search Report and Written Opinion issued for PCT/US2008/056673; Dated: Aug. 19, 2008; 9 Pages.
Yang Liu et al.;"Reconstructing B-spline Curves from Point Clouds—A Tangential Flow Approach Using Least Squares Minimization"; Department of Computer Science; The University of Hong Kong; 9 Pages.
Website Interview by Tom Sassoon, Parts I-IV; Http://www.variety.com/index.asp?layout=videoBC&bcpid=1529573051; Optical Disk.
International Search Report and Written Opinion issued for PCT/US2008/056661; Dated: Jul. 14, 2008; 10 Pages.
International Search Report and Written Opinion issued for PCT/US2008/056668; Dated: Jul. 14, 2008; 10 Pages.
International Search Report and Written Opinion issued for PCT/US2008/056686, dated Dec. 23, 2009, 6 pages.
International Search Report and Written Opinion issued for PCT/US2008/056692, issued on Jun. 1, 2009, 6 pages.
Author: Jiunn-Shyan Lee et al., Title "Patch-based Algorithms for Constrained Texture Synthesis and Labeled Texture Transfer", pp. 1-7, Date: Aug. 25-27, 2002.
International Search Report and Written Opinion issued for PCT Application No. PCT/US2008/056679, issued on Jun. 2, 2009, 7 pages.
Cass Everitt, "Order-Independent Transparency", Source: NVIDIA Corporation, pp. 1-14, Date: Oct. 11, 2003 http://replay.web.archive.org/20031011233027/http://developer.nvidia.com/object/order_independent_transparency.html.
Mouragnon, et al., "Real time localization arid 3D reconstruction," Proceedings of the 2006 IEEE Computer Society Conference on Computer Vision and Pattern Recognition, 2006, 8 pages.
Chang, et al., "On an Analysis of Static Occlusion in Stereo Vision," IEEE <http://ieeexplore.iee.org/stamp/stamp.jsp?tp=&arnumber=139799>, 1991, 2 pages.

* cited by examiner

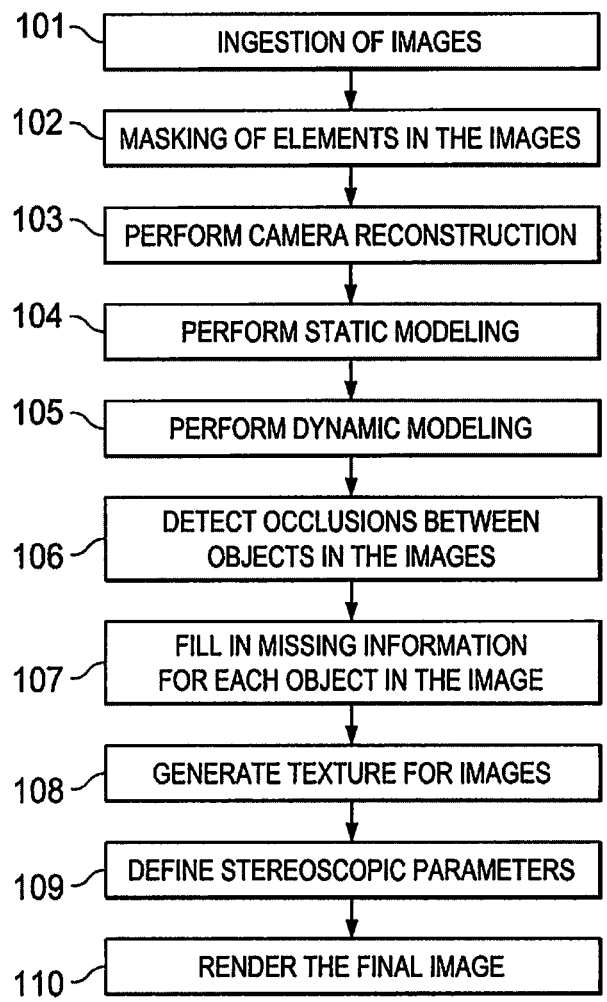
FIG. 1
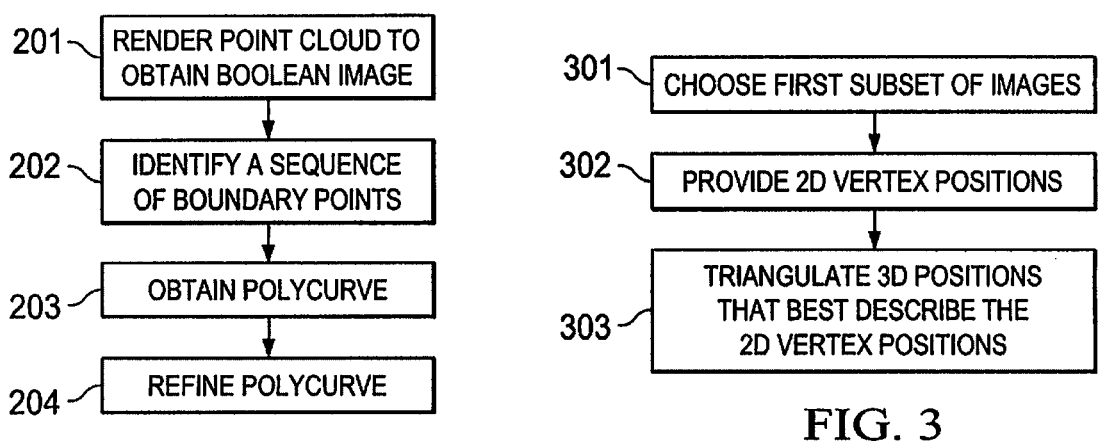
FIG. 2
FIG. 3

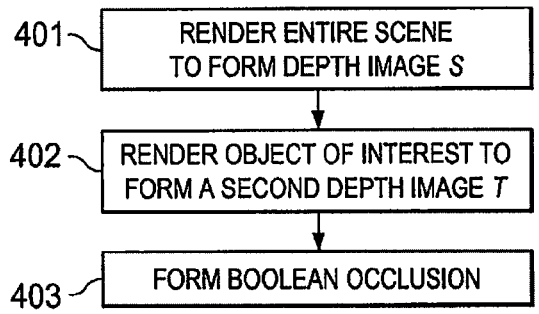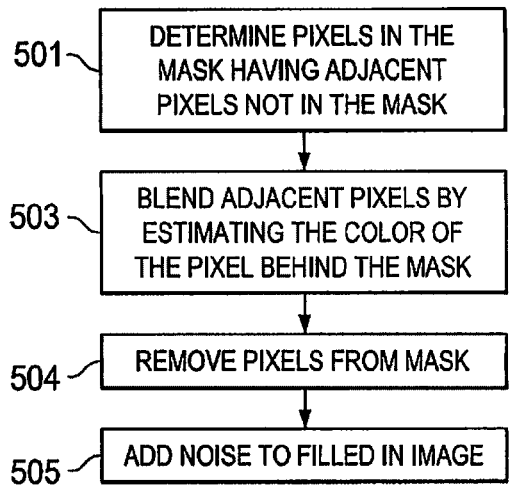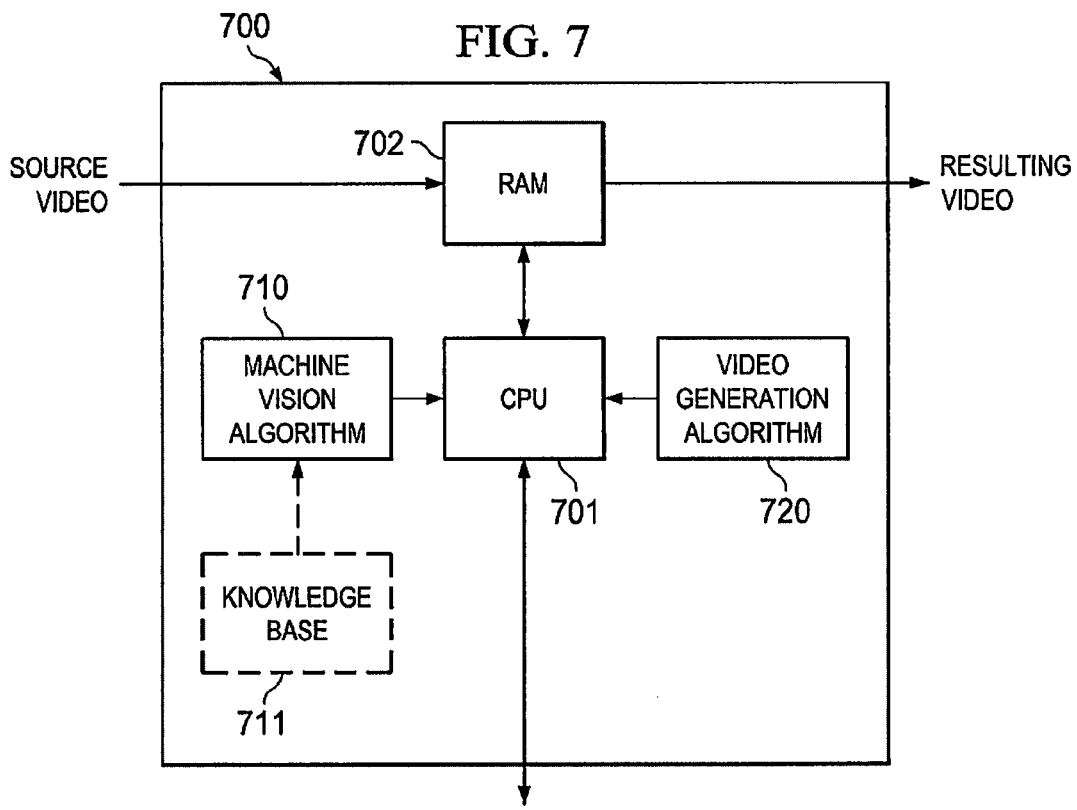

US 9,082,224 B2

SYSTEMS AND METHODS 2-D TO 3-D CONVERSION USING DEPTH ACCESS SEGIMENTS TO DEFINE AN OBJECT

CROSS-REFERENCE TO RELATED APPLICATIONS

This application claims priority to U.S. Provisional Patent Application No. 60/894,450 filed Mar. 12, 2007 entitled "TWO-DIMENSIONAL TO THREE-DIMENSIONAL CONVERSION", and is a continuation to U.S. patent application Ser. No. 12/046,272 filed Mar. 11, 2008, entitled "SYSTEMS AND METHODS FOR FILLING OCCLUDED INFORMATION FOR 2-D TO 3 D CONVERSION" the disclosures of which are incorporated herein by reference and is also related to U.S. patent application Ser. No. 12/046,215 filed Mar. 11, 2008, entitled 'SYSTEMS AND METHODS FOR 2-D TO 3-D IMAGE CONVERSION USING MASK TO MODEL, OR MODEL TO MASK, CONVERSION; U.S. patent application Ser. No. 12/046,235 filed Mar. 11, 2008, entitled "SYSTEMS AND METHODS FOR 2 D TO 3-D CONVERSION USING DEPTH ACCESS SEGMENTS TO DEFINE AN OBJECT"; U.S. patent application Ser. No. 12/046,247, filed Mar. 11, 2008 entitled "SYSTEM AND METHOD FOR USING FEATURE TRACKING TECHNIQUES FOR THE GENERATION OF MASKS IN THE CONVERSION OF TWO-DIMENSIONAL IMAGES TO THREE-DIMENSIONAL IMAGES"; U.S. patent application Ser. No. 12/046,255 filed Mar. 11, 2008, entitled "SYSTEMS AND METHODS FOR GENERATING 3-D GEOMETRY USING POINTS FROM IMAGE SEQUENCES"; U.S. patent application Ser. No. 12/046,263 filed Mar. 11, 2008, entitled "SYSTEMS AND METHODS FOR TREATING OCCLUSIONS IN 2-D TO 3-D IMAGE CONVERSION"; U.S. patent application Ser. No. 12/046,281 filed Mar. 11, 2008, entitled "SYSTEMS AND METHODS FOR FILLING LIGHT IN FRAMES DURING 2-D TO 3-D IMAGE CONVERSION", U.S. patent application Ser. No. 12/046,290 filed Mar. 11, 2008, entitled "SYSTEMS AND METHODS FOR ALLOWING A USER TO DYNAMICALLY MANIPULATE STEREOSCOPIC PARAMETERS", and U.S. patent application Ser. No. 12/046,295 Mar. 11, 2008, entitled "SYSTEMS AND METHODS FOR DEPTH PEELING USING STEREOSCOPIC VARIABLES DURING THE RENDERING OF 2-D TO 3-D IMAGES," the disclosures of which are incorporated herein by reference.

TECHNICAL FIELD

The present disclosure is directed towards two-dimensional (2-D) to three-dimensional (3-D) conversion of images. More specifically the present disclosure is directed to systems and methods for 2-D to 3-D conversion using depth access segments to define an object.

BACKGROUND OF THE INVENTION

Humans perceive the world in three spatial dimensions. Unfortunately, most of the images and videos created today are 2-D in nature. If we were able to imbue these images and videos with 3-D information, not only would we increase their functionality, we could dramatically increase our enjoyment of them as well. However, imbuing 2-D images and video with 3-D information often requires completely reconstructing the scene from the original 2-D data depicted. A given set of images can be used to create a model of the observer (camera/viewpoint) together with models of the objects in the scene (to a sufficient level of detail) enabling the generation of realistic alternate perspective images of the scene. A model of a scene thus contains the geometry and associated image data for the objects in the scene as well as the geometry for the cameras used to capture those images.

A number of technologies have been proposed and, in some cases, implemented to perform a conversion of one or several two dimensional images into one or several stereoscopic three dimensional images. The conversion of two dimensional images into three dimensional images involves creating a pair of stereoscopic images for each three dimensional frame. The stereoscopic images can then be presented to a viewer's left and right eyes using a suitable display device. The image information between respective stereoscopic images differ according to the calculated spatial relationships between the objects in the scene and the viewer of the scene. The difference in the image information enables the viewer to perceive the three dimensional effect.

An example of a conversion technology is described in U.S. Pat. No. 6,477,267 (the '267 patent). In the '267 patent, only selected objects within a given two dimensional image are processed to receive a three dimensional effect in a resulting three dimensional image. In the '267 patent, an object is initially selected for such processing by outlining the object. The selected object is assigned a "depth" value that is representative of the relative distance of the object from the viewer. A lateral displacement of the selected object is performed for each image of a stereoscopic pair of images that depends upon the assigned depth value. Essentially, a "cut-and-paste" operation occurs to create the three dimensional effect. The simple displacement of the object creates a gap or blank region in the object's background. The system disclosed in the '267 patent compensates for the gap by "stretching" the object's background to fill the blank region.

The '267 patent is associated with a number of limitations. Specifically, the stretching operations cause distortion of the object being stretched. The distortion needs to be minimized to reduce visual anomalies. The amount of stretching also corresponds to the disparity or parallax between an object and its background and is a function of their relative distances from the observer. Thus, the relative distances of interacting objects must be kept small.

Another example of a conversion technology is described in U.S. Pat. No. 6,466,205 (the '205 patent). In the '205 patent, a sequence of video frames is processed to select objects and to create "cells" or "mattes" of selected objects that substantially only include information pertaining to their respective objects. A partial occlusion of a selected object by another object in a given frame is addressed by temporally searching through the sequence of video frames to identify other frames in which the same portion of the first object is not occluded. Accordingly, a cell may be created for the full object even though the full object does not appear in any single frame. The advantage of such processing is that gaps or blank regions do not appear when objects are displaced in order to provide a three dimensional effect. Specifically, a portion of the background or other object that would be blank may be filled with graphical information obtained from other frames in the temporal sequence. Accordingly, the rendering of the three dimensional images may occur in an advantageous manner.

In reconstructing these scenes, features in the 2-D images, such as edges of objects, often need to be identified, extracted and their positions ascertained relative to the camera. Differences in the 3-D positions of various object features, coupled with differing camera positions for multiple images, result in relative differences in the 3-D to 2-D projections of the features that are captured in the 2-D images. By determining the positions of features in 2-D images, and comparing the relative locations of these features in images taken from differing camera positions, the 3-D positions of the features may be determined.

However, fundamental problems still exist with current conversion methods. For example, a typical motion picture will have a very large and predetermined image set, which (for the purposes of camera and scene reconstruction) may contain extraneous or poorly lit images, have inadequate variations in perspective, and contain objects with changing geometry and image data. Nor can the known conversion methods take advantage of the processor saving aspects of other applications, such as robot navigation applications that, while having to operate in real time using verbose and poor quality images, can limit attention to specific areas of interest and have no need to synthesize image data for segmented objects.

In addition, existing methods of conversion are not ideally suited for scene reconstruction. The reasons for this include excessive computational burden, inadequate facility for scene refinement, and the point clouds extracted from the images do not fully express model-specific geometry, such as lines and planes. The excessive computational burden often arises because these methods correlate all of the extracted features across all frames used for the reconstruction in a single step. Additionally, existing methods may not provide for adequate interactivity with a user that could leverage user knowledge of scene content for improving the reconstruction.

The existing techniques are also not well suited to the 2-D to 3-D conversion of things such as motion pictures. Existing techniques typically cannot account for dynamic objects, they usually use point clouds as models which are not adequate for rendering, and they do not accommodate very large sets of input images. These techniques also typically do not accommodate varying levels of detail in scene geometry, do not allow for additional geometric constraints on object or camera models, do not provide a means to exploit shared geometry between distinct scenes (e.g., same set, different props), and do not have interactive refinement of a scene model.

BRIEF SUMMARY OF THE INVENTION

The present invention is directed to systems and methods which concern 2-D to 3-D images. The various embodiments of the present invention involve acquiring and processing a sequence of 2-D images, generating camera geometry and static geometry of a scene in those usages and converting the subsequent data into a 3-D rendering of that scene.

Embodiments of the invention are directed to systems and methods for controlling 2-D to 3-D image conversion. Embodiments include receiving an image and masking the objects in the image using segmentation layers Each segmentation layer can have weighted values for static and dynamic features. Iterations are used to form the final image which, if desired, can be formed using less than all of the segmentation layers. A final iteration can be run with the weighted values equal for static and dynamic features.

One embodiment of the invention is a method of converting 2-D images to 3-D images that comprises rendering a point cloud according to a camera model; obtaining a boolean image from said point cloud; identifying a plurality of segmentation layers within said boolean image, each said layer having static and dynamic features; assigning weighted values to said static and dynamic features such that static features receive a higher weight value than do dynamic features; and calculating a scene geometry by iterating said segmentation layers.

Another embodiment of the invention is a method of creating a 3-D image that comprises obtaining object models of each said image to be created; generating a plurality of segmentation layer masks from each said obtained model, each said layer having static and dynamic features; and rendering a 3-D image from an assembled set of said generated masks.

A further embodiment of the invention is code for controlling a processor to create a 3-D image that comprises control sequences for obtaining object models of each said image to be created; control sequences for generating a plurality of segmentation layer masks from each said obtained model, each said layer having static and dynamic features; and control sequences for rendering a 3-D image from an assembled set of said generated masks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 is a flow diagram illustrating the steps of 2-D to 3-D conversion according to an embodiment of the invention;

FIG. 2 is a flow diagram illustrating the steps for automatically masking an object according to one embodiment of the invention;

FIG. 3 is a flow diagram illustrating the steps of generating a camera geometry according to one embodiment of the invention;

FIG. 4 is a flow diagram illustrating the steps of managing object occlusion according to one embodiment of the invention;

FIG. 5 is a flow diagram illustrating the steps for removing an object and filling in the missing information according to one embodiment of the invention;

FIG. 7 depicts a system implemented according to one representative embodiment.

DETAILED DESCRIPTION OF THE INVENTION

Figure 6:
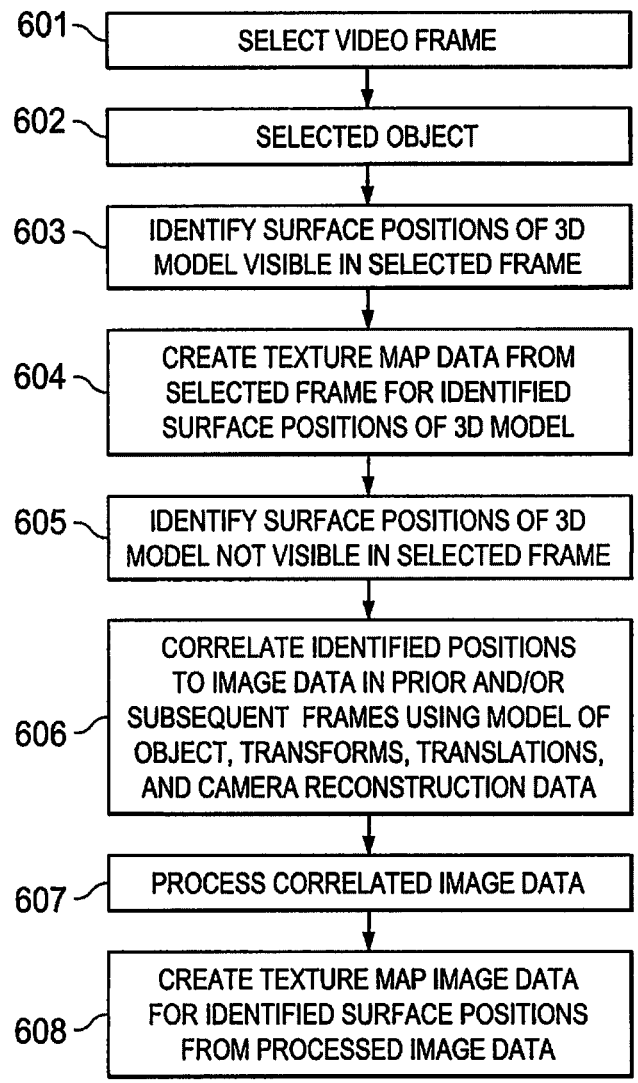
FIG. 6 depicts a flowchart for generating texture data according to one representative embodiment.

The process of converting a two dimensional (2-D) image to a three dimensional (3-D) image according to one embodiment of the invention can be broken down into several general steps. FIG. 1 is a flow diagram illustrating an example process of conversion at a general level. It should be noted that FIG. 1 presents a simplified approach to the process of conversions those skilled in the art will recognize that the steps illustrated can be modified in order such that steps can be performed concurrently. Additionally in some embodiments the order of steps is dependent upon each image. For example the step of masking can be performed, in some embodiments, up to the point that occlusion detection occurs. Furthermore, different embodiments may not perform every process shown in FIG. 1.

Additional description of some aspects of the processes discussed below can be found in, U.S. Pat. No. 6,456,745, issued Sep. 24, 2002, entitled METHOD AND APPARATUS FOR RE-SIZING AND ZOOMING IMAGES BY OPERATING DIRECTLY ON THEIR DIGITAL TRANSFORMS, U.S. Pat. No. 6,466,205, issued Oct. 15, 2002, entitled SYSTEM AND METHOD FOR CREATING 3-D MODELS FROM 2-D SEQUENTIAL IMAGE DATA, U.S. patent application Ser. No. 10/946,955, filed Sep. 22, 2004, entitled SYSTEM AND METHOD FOR PROCESSING VIDEO IMAGES, and U.S. patent application Ser. No. 11/627,414, filed Jan. 26, 2007, entitled METHODOLOGY FOR 3-D SCENE RECONSTRUCTION FROM 2-D IMAGE SEQUENCES, the contents of which are hereby incorporated by reference in their entirety.

At process 101 of the illustrated embodiments ingestion of the images occurs. At this step, images are digitized and brought into the associated system for conversion. Preprocessing of the images occurs at process 101 to break the footage into discreet segments or cuts. Also at this step, the footage is formed into the file structure required for the system. Further object lists representing objects in the image are created for each of the discreet cuts. Additionally, other image processing techniques can be performed such as color correction, the creation of additional sequences with different file structures for different parts of the process (e.g. different color depths). Cache files also can be created at different resolutions, and metadata also can be associated with the various areas of the structure.

At process 102 of the illustrated embodiment, the masking process occurs. At this step outlines are created for the various elements of the individual cuts identified at process 101. During this process both manual and automatic processes can be used to define discreet elements in the cuts. Again it should be noted that process 102 can occur prior to process 103, but in other embodiments process 102 can be performed at any point prior to process 106. Various masking processes are disused in the masking section below.

At process 103 camera reconstruction is performed. At this step cameras are created for each of the individual cuts. The cameras are created using various camera reconstruction techniques. From the camera reconstruction a camera file is generated for each cut. In some embodiments, camera geometry and static geometry can also be created via artist interpretation of the ingested image sequence. Various methods of generating camera and static geometry are discussed in the section below.

At process 104 of the illustrated embodiment, static modeling is performed. At this step models of elements that are stationary within the scene are preferably created. Geometries representing the shape and size are created. This conceptually forms the environment in which the cut occurs.

At process 105 of the illustrated embodiment, dynamic modeling occurs. At this step models are created for objects that are moving in the environment created in process 104. Geometries representing the shape, size and position of the moving objects are created relative to the environment and other dynamic objects in the images.

At process 106 of the illustrated embodiment, occlusion detection is performed. During occlusion detection areas of overlap between objects and the environment are preferably calculated. Bitmaps may then be created to represent the occlusions. This allows for the system to know the discreet elements of each object that are both visible and not visible from the camera perspective. Various methods of handling occlusion are described in the section Handling Occlusion below.

At process 107 of the illustrated embodiment, filling is performed. Filling recreates the occluded regions of each element. This process can use both automatic and manual techniques. A temporal filling method can be used to recreate information in one frame that is available in other frames from the movement of models and the camera. A spatial method can be uses which use information available within the image itself to synthesize the missing information. Various methods are further described in the section Spatial Methods below.

At process 108 of the illustrated embodiment, texture generation is performed. Texture generation takes information created at process 107 and applies it to the models to create texture. Texture generation may also use information from images. Additional discussion of texture generation appears in the Texture section below.

At process 109 of the illustrated embodiment, visualization or stereo visualization is performed. This process determines the stereoscopic parameters of the image in 3-D. The point upon which the eyes or the camera converge, the convergence point, is defined as is the inter-ocular distance, the space between the eyes or the cameras. These values are applied either as static or dynamic values. Visualization is further described in the Visualization section below.

The final process of the conversion as set forth in the illustrated embodiment is the rendering of the image. This is shown at process 110. At 110 based on the result of process 109 full resolution of the images is rendered for the left and right images. Rendering further described in the Rendering section below. Note that in its most minimal form, embodiments define a single object, set the stereo parameters, and render.

Masking

In one embodiment, a mask is generated from an object model using a polycurve. A polycurve is a closed sequence of adjacent parametric curves, such as Bezier or B-spline curves. However, in other embodiments the polycurve, or other structure, is a definition of a subset of pixels in each image representing an object. A 2-D polycurve can be taken to represent a planar region under certain geometric constraints (e.g., no constituent curve intersects any other except at endpoints). A 2-D polycurve (exterior) together with zero or more 2-D polycurves (holes) is taken to represent a planar region with holes, provided all of the hole regions are contained within the exterior and are disjoint. A 2-D mesh representation of this region is constructed by overlaying the region with a rectangular grid of a chosen resolution. Each grid element is classified as being interior to the region, exterior to the region, or intersecting the boundary of the region. In one embodiment, a mesh is generated through a modified scan-line traversal of the grid, where the number of triangles contributed by each grid element to the resulting mesh depends on its classification. In this classification, exterior elements have no contribution, interior elements contribute two triangles, and boundary elements contribute one or more triangles depending on how many corners of the grid element lie within the region.

The resulting 2-D mesh is converted into a 3-D mesh by reverse-projecting it onto any viewing plane in the 3-D space. Further, the obtained 3-D planar mesh is 'lofted' to form a 3-D mesh with volume by replicating/mirroring the surface structure. In one embodiment, this process introduces additional copies of internal vertices or of all vertices together with the required edges and faces. The resulting 3-D mesh can then be manipulated by any one of the standard modeling techniques known to those of skill in the art.

In an alternative embodiment, the 3-D mesh is converted to 2-D polycurves. Conversion from a 3-D mesh to a collection of 2-D polycurves which define a region is achieved by first rendering the 3-D mesh to produce a boolean image. Next, using image processing, partitioning occurs to partition the boundary pixels into a collection of pixel paths representing an exterior and a list of holes. Then curve fitting techniques are used to generate polycurves which approximate each of these component regions.

There have been numerous attempts to use auto-masks to either fully generate a mask or to refine an initially supplied mask. Livewire and Livelane are techniques that assist a user in masking to increase efficiency and accuracy. These have been discussed in "User-steered image segmentation paradigms: live wire and live lane" Graphical Models and Image Processing, Volume 60, Issue 4 (July 1998) Pages: 233-260, the contents of which are hereby incorporated by reference in their entirety. In general, these techniques utilize the fact that a user is good at recognizing objects and can quickly provide a crude mask, whereas a computer is good at calculating the optimal pixels that separate the object.

Active contours and snakes are other techniques that can either be user assisted or fully automated. Active contours have been described in IEEE Transactions on Volume 10, Issue 2, February 2001 Page(s): 266-277, the contents of which are hereby incorporated by reference in their entirety. In general, these techniques utilize a curve and iteratively evolve the curve, subject to a set of constraints, until an equation minimum has been found. The goal is that the equation will be at a minimum when the curve matches the outline of one or more objects.

One embodiment of the present disclosure is directed to a novel feature-tracking algorithm for use in generating a mask. This approach is based off of the data structures used to represent the mask. The polycurve polygon, a series of polycurves connected to form a loop, is the primary data structure used to define a mask. The feature tracking algorithm assumes that every endpoint of a polycurve corresponds to a feature in the image. The algorithm is preferably initialized by providing a very accurate polycurve polygon of the desired object to be masked in a very small subset of the images. In one embodiment, the subset used represents an equal distribution of the total set, such as the first, middle, and last image. The feature tracker algorithm in such an embodiment can then track all the endpoint vertices of the polycurve polygon. The algorithm assumes that the object is more or less rigid, and thus the position of the control vertices of polycurve polygon remain relative to endpoint vertices. In some embodiments the control vertices can be automatically refined using image analysis tools.

One current embodiment of the feature tracker algorithm of the present invention works in a sequential manner. That is, the feature tracking algorithm starts at either end of the image set and works its way to the other. The algorithm can work on the image set in any order. The algorithm assumes not only that the provided frames are correct but also all previously tracked frames are correct and uses that information to help locate the position of the vertex in subsequent frames. Thus, if the tracker algorithm fails to locate the correct position of a vertex in one frame, it will likely fail to locate the correct position in many (or all) subsequent frames. In this event the user is able to manually specify the position of the vertex in any of the incorrect frames. The algorithm is then rerun with the assumption that this newly provided information is accurate and the additional information will be sufficient to track the vertex in all other incorrect frames. This iterative process can be performed as many times as necessary to correctly track all features and thus correctly mask the object.

In another embodiment, an alternative approach for masking is used. In this approach, masks, feature detection, and tracking, together with possible user input, are used as the basis for deriving a set of 'features' within a sequence of images. Each such feature comprises a list of pairs: the first element indicating the source image and the second element describing the feature geometry in image coordinates (e.g. a 2D point). Such a feature set is described in relation to a method of camera reconstruction described in U.S. patent application Ser. No. 11/627,414 (hereby incorporated herein by reference), where each feature determines a point in 3D scene coordinates. The reconstruction process determines this 3D point through a global optimization process according to which an error value is assigned each feature to describe how closely the estimated camera model maps the 3D point to the observed 2D image points. A threshold on this error value can be used to recognize 'outliers'—features whose inclusion in the optimization process has a detrimental effect on the calculated scene geometry. This provides a means of classifying features as static vs dynamic: features whose image-coordinate motion is accurately described by the camera model correspond to static geometry, while the complementary set correspond to dynamic geometry.

Given an initial classification of features into static/dynamic, camera reconstruction can be used in an iterative fashion to refine this classification. The initial classification can be given in the form of approximate boolean image masks for the dynamic objects. The initial segmentation can be used to determine weights on features for use in the optimization process—static features receiving higher weights than dynamic features and thus having the greater influence on the calculated scene geometry. Each iteration of the reconstruction process preferably updates the classification according to the determined outliers and adjusts the feature weights for the next iteration. The iteration process terminates when either: the feature classification does not change; a specified condition on the global error has been achieved; or a specified number of iterations has been performed. A final iteration should be performed without the influence of dynamic features (e.g. with zero weights) to ensure the accuracy of the calculated camera and static geometry.

The feature classification resulting from the iterative camera reconstruction process can be used to refine the initially supplied approximate dynamic object masks. If the initial masks were not supplied as polycurve regions, then such can be generated from boolean images. These initial polycurve regions can then be refined so as to include all dynamic features and to exclude all static features. A static feature may be excluded from a polycurve region by determining the nearest component curve and adjusting its parameters algorithmically. A dynamic feature can be included by determining the nearest object region and the nearest component curve therein, and adjusting the curve parameters algorithmically. This process may utilize user interaction to obtain optimal results in some cases.

A third embodiment is directed to auto generating the mask from a point cloud. During the camera reconstruction process and triangulation process a great deal of 3-D features can be produced in the form of a point cloud. The point cloud may be grouped using a segmentation process. In this approach a group of vertices represents an object in the scene. The segmentation process can be user assisted or completely manual. Following segmentation a group of feature points and the camera are used to generate a mask. In some embodiments, this mask may be very crude, but in these instances another technique, such as the afore mentioned techniques can be used to automatically refine the mask.

Segmentation can also be fully automated. The point cloud (as discussed below) can be rendered to a Boolean image. This can occur via creating a mesh from the point cloud, or by rendering each point and calculating the outline of the object by calculating the corresponding convex hull or using the previously mentioned active contours. From this Boolean image a polycurve can be create via segmentation and curve fitting techniques. This polycurve could then be refined manually, automatically or manually assisted. Refining may include image processing techniques such as the previously listed livewire, active contours, or feature tracking. Segmentation has been discussed in for example: "Recognising structure in laser scanner point clouds," G. Vosselman, B. G. H. Gorte, G. Sithole and T. Rabbanim, published by IAPRS and found at www.itc.nl/personal/vosselman/papers/vosselman2004.natscan.pdf: "Shape segmentation and matching with flow discretization," T. K. Dey, J. Giesen and S. Goswami. Proc. Workshop Algorithms Data Structures (WADS 03), LNCS 2748, F. Dehne, J.-R. Sack, M. Smid Eds., 25-36; and "Shape segmentation and matching from noisy point clouds," T. K. Dey, J. Giesen and S. Goswami, Proc. Eurographics Sympos. Point-Based Graphics (2004), Marc Alexa and S. Rusinkiewicz (eds) (2004), 193-199, the contents of which are hereby incorporated by reference in their entirety.

A mask (i.e., a 2-D polycurve) is obtained in one embodiment from a 3-D point cloud according to the process illustrated in FIG. 2. A point cloud is rendered according to the camera model to obtain a boolean image of process 201 of the illustrated embodiments of the illustrated embodiments. Next a scan-line algorithm may be employed to identify a sequence of boundary points, as is illustrated at process 202. Curve fitting techniques may be used to obtain a polycurve at process 203. The resulting polycurve is refined at process 204. This refinement can be done manually by a user, or automatically in conjunction with the previously described contour-based methods. Method of refinement has been discussed in "Reconstructing B-spline Curves from Point Clouds—A Tangential Flow Approach Using Least Squares Minimization," Yang Liu, Huaiping Yang, and Wenping Wang, International Conference on Shape Modeling and Applications 2005 (SMI'05) pp. 4-12, the contents of which are incorporated by reference in their entirety.

Camera and Static Geometry

In one embodiment, 3-D camera and scene geometry are used to calculate new 3-D geometry from supplied 2-D information via triangulation. Triangulation is discussed in U.S. patent application Ser. No. 11/627,414, filed Jan. 26, 2007, entitled "Methodology For 3-D Scene Reconstruction From 2-D Image Sequences" the contents of which are hereby incorporated by reference in their entirety. Briefly, paragraph 38 of the referenced Application is reproduced below.

The addition of mesh detail through triangulation is performed, according to some embodiments, involves adding structure to the mesh (i.e., vertices, edges and faces), and then triangulating the location of each new vertex with reference to a set of frames for which camera geometry has already been calculated (e.g., key frames). The new vertices may be assigned to images at each of the selected frames. Then the underlying 3-D scene location is calculated through triangulation. This assignment of image coordinates can be performed, in some embodiments, through user input or through application of automated feature detection and tracking algorithms. It should be noted that the more frames that are providing observed image coordinates for a vertex, the greater the accuracy of triangulated scene-coordinate point.

2-D images capture a great deal of information that can be used in a wide variety of ways depending on the viewer. Unfortunately, there is also a great deal of information that 2-D images cannot capture that is useful. Most notably is the loss of 3-D information. Viewers have the ability to infer relative positions within a 2-D image, and given certain camera angles can even take measurements from the 2-D information. However, there are often times when 3-D information of the scene or features within the scene would be of great use.

Several techniques are used to generate 3-D scene information that is associated with a set of 2-D images. Examples of this information include reconstruction from a sequence of 2-D images, on site measurements from tools such as Global Positioning System (GPS) or lasers, and artistic creation with 3-D software with or without the aid of 2-D images. Some of these techniques, such as artistic creation, can produce data that encompasses all of the 3-D information of a scene. However, most only create a small subset of the available 3-D information.

In one embodiment, using the provided image sequence and camera parameters that were used to create the image sequence, new 3-D geometry can be calculated. It should be noted that although existing scene geometry is not required, in some embodiments it is provided and enhances the usefulness of new geometry. A specific feature is calculated provided that a sufficient number (2 or more) of images in the sequence contain that feature, and that the cameras used to capture the images have sufficient disparity.

FIG. 3 is a flow diagram illustrating the process for generating a 3-D geometry according to one embodiment. A subset of the images containing the feature is chosen either as input from a user or automatically calculated. This is shown at process 301. 2-D vertex positions are provided, at process 302. These vertex positions represents the image coordinates corresponding to the feature in each of the images in the chosen subset. The cameras representing each image of the subset are used to triangulate the 3-D position that best describes all of the 2-D vertex positions. This is shown at process 303. It should be noted that there are several factors that effect the accuracy of the calculated 3-D position. These factors include the accuracy of the camera parameters, the disparity of the cameras, the accuracy in the 2-D vertex positions and the number of images in the subset.

The above process can be automated in numerous ways. For example, feature detection locates features that stand out in the image sequence. Feature tracking can position 2-D vertices in subsequent images provided, however, that an initial 2-D vertex is placed in the first image. These two techniques are coupled to automatically generate features and their associated 2-D image coordinates. Given a set images and 2-D vertex information a subset of images and corresponding 2-D vertices are automatically selected to produce the greatest accuracy.

Handling Occlusion

An occlusion is a the portion of an object's surface which is not visible from a given perspective or camera configuration. This obscuring of portions of the object can occur for a number of reasons. First, back-facing portions as well as portions outside the camera viewing volume are obscured. Second, inter-object occlusion of front-facing portions of an object occur when other objects appear between the camera and the object of interest. Third, intra-object occlusion of front-facing portions of an object occur when non-convex geometry of the object obscure potions of the object. An occlusion is logically related to an object's texture, and may be considered as an extra channel of boolean image data (i.e. true to indicate occlusion, false for non-occlusion).

In one embodiment, inter-object occlusions for projective textures are calculated according to the process illustrated in FIG. 4. At process 401 the entire scene is rendered according to the camera perspective to form a depth image S. Next, the object of interest is rendered in isolation according to the same camera perspective to form a second depth image T, and (if necessary) a boolean image indicating the object mask M. This is shown at process 402. Note that each of these three images (S, T and M) have the same dimensions. A boolean occlusion image of the same dimension is formed where each pixel p has the value $$O[p] := \text{if } M[p] \text{ then } S[p] \sim < (\text{or } \neq) T[p] \text{ else false} \quad \text{Equation 1}$$

This formation of the boolean occlusion image is illustrated at process 403.

In one embodiment, the process of FIG. 4 is implemented in a graphics application programming interface (API) using "shadow mapping". Here the depth image S is pre-computed and loaded as a depth texture. Then the shadow mapping functionality of the graphics API is used to calculate the boolean occlusion image directly from a single pass render of the chosen object in isolation. In open graphics library (OpenGL), for example, a simple fragment shader can be used to output a boolean value by comparing the depth buffer (i.e. the object depth) to the depth texture (i.e. the scene depth).

For the purpose of 2-D to 3-D conversion, additional flexibility is required when introducing inter-object occlusions. Specifically, object models often overlap slightly at their boundaries, and treating such overlap as occlusion can introduce unnecessary filling artifacts. In one embodiment, this problem is avoided by adding a user-controlled tolerance value to the comparison function of Equation 1. Specifically, the condition becomes:

$$\text{abs}(S[p]-T[p]) > \text{tolerance} \quad \text{Equation 2}$$

For the purpose of optimizing 2-D to 3-D conversion, it is desirable to limit the reconstruction of texture data to the portions of an object surface which are actually visible in the derived stereo pair. In one embodiment, this is accomplished by generating additional occlusion images OL and OR that corresponding to the left and right-eye perspectives according to the above process. Then replacing the occlusion O with the intersection of O, OL and OR. In some embodiments, a set of stereo cameras can be used to calculate the optimal occlusion. This approach allows some flexibility in choosing the stereo camera parameters during rendering without allowing any new occlusions to appear.

Spatial Methods

Spatial methods can be used in a plurality of filling techniques. One such technique is the brush fill, which is a highly user involved process. Another technique is the erode fill, which is an automatic process. Each technique has benefits in different situations.

The erode fill is designed to be an automatic filling process. There are a number of ways in which an object can be specified for removal. This can be done using the manual or automatic masking techniques discussed above. Further, for example, outlining the object via manual rotoscoping, using an automatic selection tool such as a wand, or by manually selecting all the pixels that pertain to the object. After removing an object the remaining objects should be modified to account for the removed object. Ideally, the remaining image should look as natural as possible, that is it should appear to a viewer as if the removed object was never in the image. Thus, to remove the object all of the pixels of the object should be changed to represent what is behind the object. Currently there are several techniques to achieve this. These include manually painting, temporal filling, or brushes. Many times what is behind the object is quite simple, like a white wall or blue sky. Thus, it is desirable to have an automatic filling process to fill in this simple information.

In one embodiment, the system takes an image and a binary image (the mask) representing the pixels that are to be removed as a starting point. The process of the present embodiment replaces those pixels with information taken from the remaining image. The process is iterative, and can require a very large number of iterations to complete the process. First the process identifies all pixels in the mask that have one or more adjacent pixels that are not in the mask. This is shown in process 501 of FIG. 5. Next the process estimates the color of each of these pixels by blending the color of the adjacent pixels. Each of these filled pixels is then removed from the mask, at process 503, and processes 501 and 503 are repeated again. Since pixels were removed from the mask new pixels will be found with at least one adjacent pixel not in the mask. Thus, after each iteration the mask becomes smaller until there are no pixels left in the mask. Note that the flow of FIG. 5 is an example, and other embodiments may use fewer processes.

However, sometimes it does not make sense to assume that all pixels not in the provided mask can be used. Thus, in some embodiments, a second binary image can be provided representing the pixels that the process can choose from. Thus, for each iteration only pixels with at least one adjacent pixel from the second supplied mask will be filled at process 503. In this embodiment, processes of FIG. 5 terminate when the intersection of the source and target masks is empty.

In another embodiment, the processes depicted in FIG. 5 accounts for digital noise that is found in most digital images. If during the filling and estimating process a noise pixel is adjacent to a pixel to be filled, and it is the only adjacent pixel then the color of this noise will be copied to the filled pixel. In order to avoid a copying of noise, in one embodiment, only pixels with a sufficient number of adjacent good pixels will be filled. This approach causes the noise pixels to be blended with non-noise pixels giving the filled pixel a much more accurate color. In one embodiment, the sufficient number of pixels can be supplied by the user, or can be automatically determined via analysis of the supplied image. To prevent the resulting filled image from appearing too smooth, because there is noise throughout the image except in area that has been filled, one embodiment provides noise to the filled image either during the filling process or via separate process used in conjunction with the filling process. This is shown at optional process 505.

Texture Data

FIG. 6 is a flowchart depicting one example embodiment for creating texture map data for a three dimensional object for a particular temporal position. The flowchart for creating texture map data begins in step 601 of the depicted embodiment where a video frame is selected. The selected video frame identifies the temporal position for which the texture map generation will occur. In step 602 of the depicted embodiment, an object from the selected video frame is selected.

In step 603, of the depicted embodiment, surface positions of the three dimensional model that correspond to visible portions of the selected object in the selected frame are identified. The identification of the visible surface positions may be performed, as an example, by employing ray tracing from the original camera position to positions on the three dimensional model using the camera reconstruction data. In step 604 of the depicted embodiment, texture map data is created from image data in the selected frame for the identified portions of the three dimensional model.

In step 605 of the depicted embodiment, surface positions of the three dimensional model that correspond to portions of the object that were not originally visible in the selected frame are identified. In one embodiment, the entire remaining surface positions are identified in step 605 thereby causing as much texture map data to be created for the selected frame as possible. In certain situations, it may be desirable to limit construction of the texture data. For example, if texture data is generated on demand, it may be desirable to only identify surface positions in this step (i) that correspond to portions of the object not originally visible in the selected frame and (ii) that have become visible due to rendering the object according to a modification in the viewpoint. In this case, the amount of the object surface exposed due to the perspective change can be calculated from the object's camera distance and a maximum inter-ocular constant.

In step 606 of the depicted embodiment, the surface positions identified in step 605 are correlated to image data in frames prior to and/or subsequent to the selected frame using the defined model of the object, object transformations and translations, and camera reconstruction data. In step 607 of the depicted embodiment, the image data from the other frames is subjected to processing according to the transformations, translations, and camera reconstruction data. For example, if a scaling transformation occurred between frames, the image data in the prior or subject frame may be either enlarged or reduced depending upon the scaling factor. Other suitable processing may occur. In one representative embodiment, weighted average processing may be used depending upon how close in the temporal domain the correlated image data is to the selected frame. For example, lighting characteristics may change between frames. The weighted averaging may cause darker pixels to be lightened to match the lighting levels in the selected frame. In one representative embodiment, light sources are also modeled as objects. When models are created for light sources, lighting effects associated with the modeled objects may be removed from the generated textures. The lighting effects would then be reintroduced during rendering.

In step 608 of the depicted embodiment, texture map data is created for the surface positions identified in step 605 from the data processed in step 607 of the depicted embodiment. Because the translations, transformations, and other suitable information are used in the image data processing, the texture mapping of image data from other frames onto the three dimensional models occurs in a relatively accurate manner. Specifically, significant discontinuities and other imaging artifacts generally will not be observable.

In one representative embodiment, steps 604-607 are implemented in association with generating texture data structures that represent the surface characteristics of an object of interest. A given set of texture data structures define all of the surface characteristics of an object that may be recovered from a video sequence. Also, because the surface characteristics may vary over time, a texture data structure may be assigned for each relevant frame. Accordingly, the texture data structures may be considered to capture video information related to a particular object.

Visualization

Another embodiment of the present disclosure is directed to an interactive system for observing and manipulating the stereo effect in a sequence of stereo pairs (frames) obtained by rendering a scene model according to a stereo camera model. The stereo camera model comprises a given camera model together with values for inter-ocular and convergence-point distances suitably animated over a sequence of frames. The scene model comprises a number of object models together with any additional data required to render realistic images of the scene at the desired frames (e.g. lighting data). Each object model includes the data required to render realistic images of the object at the desired frames. This data may comprise a mesh specifying the object geometry to a sufficient level of detail, texture data, and masking data used to clip the projection of approximate geometry.

For the purpose of 2-D to 3-D conversion, in one embodiment, the original image sequence serves uniformly as the texture data for all objects using the techniques of projective texture mapping.

Embodiments allow for the independent choice of both an inter-ocular distance and a convergence distance for each of the desired frames. These parameters can be specified using a Graphical User Interface (GUI), or through an input device, such as a keyboard or mouse. Embodiments allow users to move freely through the sequence of frames adjusting the stereo camera parameters, and observing the corresponding effects through any viable means for stereo pair presentation (e.g. interleaved via shutter glasses, dual projector via polarization). Using interpolation techniques, these values are preferably specified at chosen key frames to reduce the burden on the user. this allows the user to define any number of stereo camera models, and to switch between these modes easily for reference. In some embodiments, caching of rendered images is used to improve performance when switching between frames.

This process allows for the rendering of the scene in its entirety, or to limit rendering to a selected collection of objects within the scene. This allows for rendering objects as wireframes, as surfaces with texture data, in some embodiments, or permit any other visual effect applied (e.g. lighting). In the case of texture mapping, in some embodiments, the technique applied may be a simplification of the technique use in final rendering. That is the process may not use depth peeling.

Rendering

In one embodiment, rendering of images is performed by depth peeling. Depth peeling is an order independent approach that allows for correct blending of inter related models. Typically rendering engines either use a depth traversal tree, rendering layers or some sort of per pixel rendering algorithm (ray tracing, global illumination, photon mapping, radiosity, etc. . . . ). The rendering approach of the present embodiments is capable of generating both left and right eye images from scene assets using the stereoscopic variables as defined within the stereoscopic camera data structure. The left and right-eye projections for stereo rendering are obtained with respect to the original camera model using an "off-axis" method. To achieve an order independent rendering engine a multi pass approach is taken. For each image that is created a number of scene traversals are performed that peel off each depth layer based on a previous traversals depth map. After completion of rendering all of the layers, the layers are then blended together from back to front. The rendering engine of the present embodiments can render out the scene in its entirety or just in portions. Further the rendering engine can also change the number of rendering traversals. Blending of the layers is done on the final stage, and can use any known blend function to generate the correct blending. To increase smoothness among objects edges anti-aliasing can be performed to remove any unwanted jaggies (jagged edges).

Implementation

An embodiment of the present invention may utilize a general purpose processor-based system, such as PC 700 illustrated in FIG. 7, adapted to manipulate video image information through the use of machine vision algorithm 710 and video generation algorithm 720. PC 700 includes processor (CPU) 701 coupled to memory (RAM) 702. RAM 702 provides storage for digitized image information associated with a source video image as well as for any video image resulting from the operation of the present invention. PC 700 is also adapted to accept input of a source video as well as output a resulting video. Of course, acceptance and output of such video may be in digitized form. Alternatively, PC 700 may be adapted to accept and/or output analogue video, such as in the form of National Television System Committee (NTSC) compatible signals. It should be noted that while a processor is shown, the system could be hard wires, or could be a series of processors.

PC 700 also includes an operator interface providing information exchange with an operator of the system. Such information exchange may include the display of source and/or resulting video images on a suitable display device. Additionally, the information exchange may include an operator selecting and/or inputting information with respect to the generation of video images according to the present invention.

Figure 8:
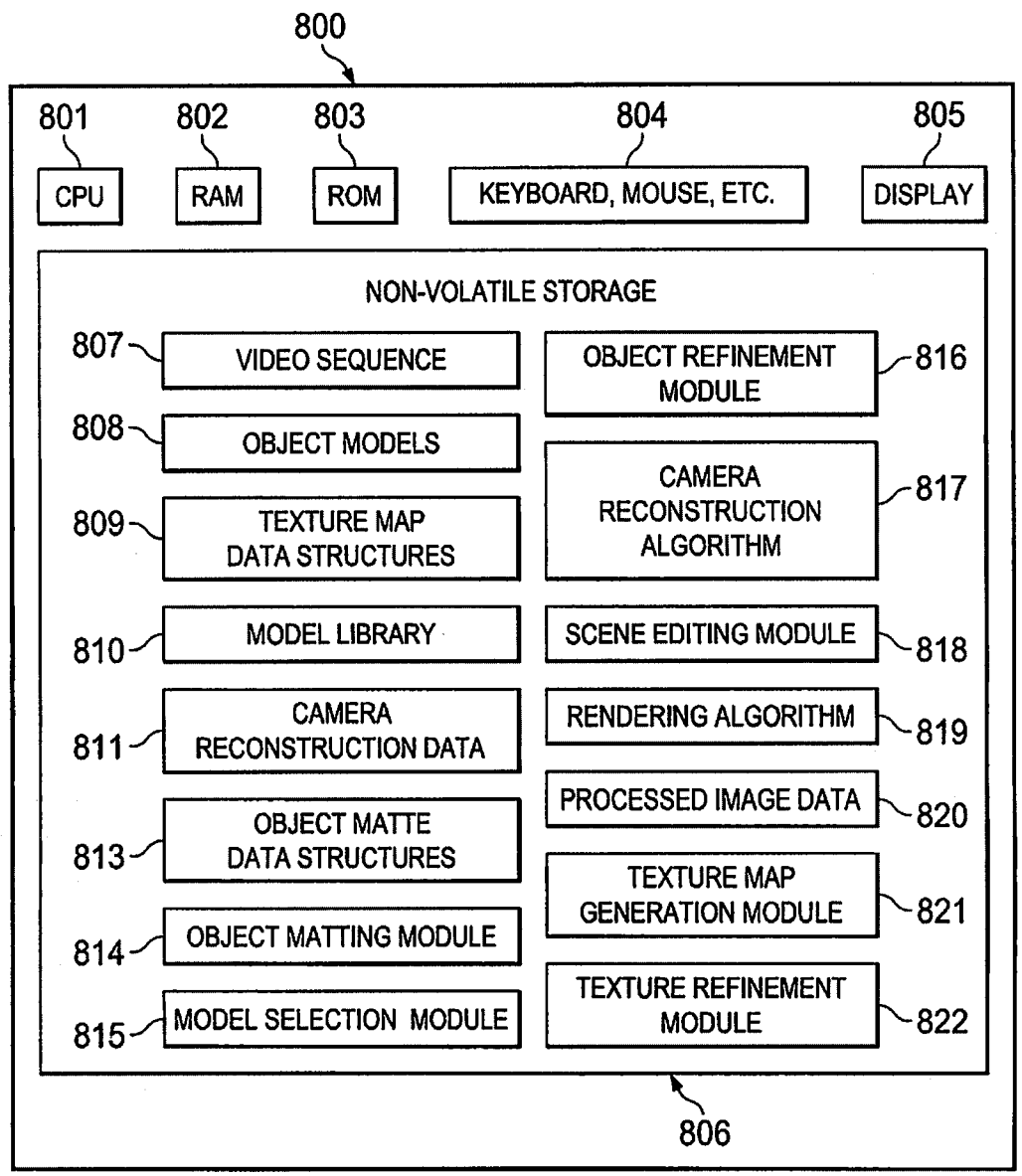
FIG. 8 illustrates a block diagram of one embodiment of the present invention.

FIG. 8 depicts system 800 for processing a sequence of video images according to one representative embodiment. System 800 may be implemented on a suitable computer platform such as depicted in FIG. 7. System 800 includes conventional computing resources such as central processing unit 801, random access memory (RAM) 802, read only memory (ROM) 803, user-peripherals (e.g., keyboard, mouse, etc.) 804, and display 805. System 800 further includes non-volatile storage 806.

Non-volatile storage 806 comprises data structures and software code or instructions that enable conventional processing resources to implement some representative embodiments. The data structures and code may implement the flowcharts of FIGS. 6 and 7 as examples.

As shown in FIG. 8, non-volatile storage 806 comprises video sequence 807. Video sequence 807 may be obtained in digital form from another suitable medium (not shown). Alternatively, video sequence 807 may be obtained after analog-to-digital conversation of an analog video signal from an imaging device (e.g., a video cassette player or video camera). Object matting module 814 defines outlines of selected objects using a suitable image processing algorithm or algorithms and user input. Camera reconstruction algorithm 817 processes video sequence 807 to determine the relationship between objects in video sequence 807 and the camera used to capture the images. Camera reconstruction algorithm 817 stores the data in camera reconstruction data 811.

Model selection module 815 enables model templates from model library 810 to be associated with objects in video sequence 807. The selection of models for objects are stored in object models 808. Object refinement module 816 generates and encodes transformation data within object models 808 in video sequence 807 using user input and autonomous algorithms. Object models 808 may represent an animated geometry encoding shape, transformation, and position data over time. Object models 808 may be hierarchical and may have an associated template type (e.g., a chair).

Texture map generation module 821 generates textures that represent the surface characteristics of objects in video sequence 807. Texture map generation module 821 uses object models 808 and camera data 811 to generate texture map data structures 809. Preferably, each object comprises a texture map for each key frame that depicts as much surface characteristics as possible given the number of perspectives in video sequence 807 of the objects and the occlusions of the objects. In particular, texture map generation module 821 performs searches in prior frames and/or subsequent frames to obtain surface characteristic data that is not present in a current frame. The translation and transform data is used to place the surface characteristics from the other frames in the appropriate portions of texture map data structures 809. Also, the transform data may be used to scale, morph, or otherwise process the data from the other frames so that the processed data matches the characteristics of the texture data obtained from the current frame. Texture refinement module 822 may be used to perform user editing of the generated textures if desired.

Scene editing module 818 enables the user to define how processed image data 820 is to be created. For example, the user may define how the left and right perspectives are to be defined for stereoscopic images if a three dimensional effect is desired. Alternatively, the user may provide suitable input to create a two dimensional video sequence having other image processing effects if desired. Object insertion and removal may occur through the receipt of user input to identify objects to be inserted and/or removed and the frames for these effects. Additionally, the user may change object positions.

When the user finishes inputting data via scene editing module 818, the user may employ rendering algorithm 819 to generate processed image data 820. Processed image data 820 is constructed using object models 808, texture map data structures 809, and other suitable information to provide the desired image processing effects.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory, machine-readable storage medium comprising instructions stored therein, the instructions executable by one or more processors to facilitate performing a method for creating one or more 3-D images, said method comprising:
   obtaining object models of each said image to be created;
   generating a plurality of segmentation layer masks from each said obtained model, each said segmentation layer mask having a plurality of features;
   rendering a 3-D image from an assembled set of said generated masks;
   classifying each of said plurality of features as being a static feature or a dynamic feature based on how closely a 3-D point in a point cloud associated with said 3-D image is mapped to a corresponding 2-D point in one or more 2-D images;
   assigning weighted values to said plurality of features such that static features receive a higher weight value than do dynamic features; and
   calculating a scene geometry by iterating said segmentation layer masks, said iterating comprising iteratively determining one or more features associated with one or more respective 3-D points that do not satisfy a threshold for mapping to one or more respective 2-D points, and iteratively adjusting one or more of said weighted values based on said determined one or more features, said iterating terminating after a plurality of iterations when a predetermined condition is satisfied.

2. The non-transitory, machine-readable storage medium of claim 1 wherein said generating a plurality of segmentation layer masks comprises:
   rendering said point cloud according to a camera model;
   obtaining a boolean image from said point cloud;
   identifying a sequence of boundary points in said point cloud; obtaining said polycurve from said sequence of boundary points; and
   refining said polycurve.

3. The non-transitory, machine-readable storage medium of claim 2 wherein said rendering comprises:
   forming, from each said mask, a 2-D mesh, and converting each said mesh into a 3-D planar mesh.

4. The non-transitory, machine-readable storage medium of claim 3 further comprising:
   forming a 3-D mesh from said planar mesh.

5. The non-transitory, machine-readable storage medium of claim 4 wherein said 2-D mesh is constructed using vertices and wherein said 3-D forming comprises:
   replicating surface vertices of said 2-D mesh.

6. The non-transitory, machine-readable storage medium of claim 4 wherein said rendering comprises:
   utilizing less than a full set of said segmentation masks.

7. The machine-readable storage medium of claim 1, wherein said plurality of segmentation layer masks are generated using polycurve techniques.

8. A non-transitory, machine-readable storage medium comprising instructions stored therein, the instructions executable by one or more processors to facilitate performing a method, said method comprising:
   rendering a point cloud according to a camera model, said camera model mapping a plurality of 3-D points in said point cloud to a plurality of 2-D points in one or more 2-D images;
   obtaining a boolean image from said point cloud;
   segmenting said boolean image to identify a plurality of segmentation layers within said boolean image, each said layer having a plurality of features;
   classifying each of said features as being a static feature or a dynamic feature based on how closely a 3-D point in said point cloud is mapped to a corresponding 2-D point;
   assigning weighted values to said plurality of features such that static features receive a higher weight value than do dynamic features;
   calculating a scene geometry; and
   iteratively determining one or more features associated with one or more respective 3-D points that do not satisfy a threshold for mapping to one or more respective 2-D points, and iteratively adjusting one or more of said weighted values based on said determined one or more features, said iterating terminating after a plurality of iterations when a predetermined condition is satisfied.

9. The machine-readable storage medium of claim 8, wherein said method further comprises:
   terminating said iterations when at least one of the following occurs:
      a feature classification does not change between iterations;
      specified number of iterations has been performed;
      specified condition has been achieved.

10. The machine-readable storage medium of claim 8, wherein said method further comprises:
    identifying a sequence of boundary points in said point cloud;
    obtaining a polycurve from said sequence of boundary points; and
    refining said polycurve.

11. The machine-readable storage medium of claim 8, wherein said method further comprises:
    rendering a 3-D volume image from an assembled set of generated masks.

12. The machine-readable storage medium of claim 11, wherein said rendering comprises:
    forming, from each said mask, a 2-D mesh, and
    converting each said mesh into a 3-D volume mesh.

13. The machine-readable storage medium of claim 12, wherein said 2-D mesh is constructed using vertices and wherein said 3-D volume mesh converting comprises:
    forming a planar 3-D mesh from said 2-D mesh; and
    lofting by replicating said surface vertices of said 2-D mesh.

14. The machine-readable storage medium of claim 8, wherein said method further comprises:
    resetting said weighted values to be even to each other;
    running at least one additional iteration with said reset values.

15. The machine-readable storage medium of claim 14, wherein said weighted values associated with said dynamic features are reset to zero and another iteration is run.

16. The machine-readable storage medium of claim 8, wherein said scene geometry is calculated based on iterating said segmentation layers.

17. The machine-readable storage medium of claim 16, wherein said iterating said segmentation layers comprises said step of iteratively determining said one or more features associated with said one or more respective 3-D points that do not satisfy a threshold for mapping to said one or more respective 2-D points.

18. A system for converting 2-D images to 3-D images, said system comprising:
a memory storing executable instructions;
one or more processors for executing executable instructions, the one or more processors being configured to:
execute control instructions for rendering a point cloud according to a camera model, said camera model mapping a plurality of 3-D points in said point cloud to a plurality of 2-D points in one or more 2-D images;
execute control instructions for obtaining a boolean image from said point cloud;
execute control instructions for segmenting said boolean image to identify a plurality of segmentation layers within said boolean image, each said layer having a plurality of features;
execute control instructions for classifying each of said features as being a static feature or a dynamic feature based on how closely a 3-D point in said point cloud is mapped to a corresponding 2-D point;
execute control instructions for assigning weighted values to said plurality of features such that static features receive a higher weight value than do dynamic features;
execute control instructions for calculating a scene geometry; and
execute control instructions for iteratively determining one or more features associated with one or more respective 3-D points that do not satisfy a threshold for mapping to one or more respective 2-D points, and iteratively adjusting one or more of said weighted values based on said determined one or more features, said iterating terminating after a plurality of iterations when a predetermined condition is satisfied.

19. A system for creating one or more 3-D images, said system comprising:
a memory storing executable instructions;
one or more processors for executing executable instructions, the one or more processors being configured to:
execute control instructions for obtaining object models of each said image to be created;
execute control instructions for generating a plurality of segmentation layer masks from each said obtained model, each said segmentation layer mask having a plurality of features;
execute control instructions for rendering a 3-D image from a set of said masks;
execute control instructions for classifying each of said plurality of features as being a static feature or a dynamic feature based on how closely a 3-D point in a point cloud associated with said 3-D image is mapped to a corresponding 2-D point in one or more 2-D images;
execute control instructions for assigning weighted values to said plurality of features such that static features receive a higher weight value than do dynamic features; and
execute control instructions for calculating a scene geometry by iterating said segmentation layer masks, said iterating comprising iteratively determining one or more features associated with one or more respective 3-D points that do not satisfy a threshold for mapping to one or more respective 2-D points, and iteratively adjusting one or more of said weighted values based on said determined one or more features, said iterating terminating after a plurality of iterations when a predetermined condition is satisfied.

20. The system of claim 19, wherein the executable instructions stored on the memory comprise all of said control instructions, said one or more processors being configured to execute said control instructions for generating said plurality of segmentation layer masks comprise said one or more processors being configured to:
execute control instructions for rendering said point cloud according to a camera model;
execute control instructions for obtaining a boolean image from said point cloud;
execute control instructions for identifying a sequence of boundary points in said point cloud;
execute control instructions for obtaining said polycurve from said sequence of boundary points; and
execute control instructions for refining said polycurve.

21. The system of claim 19, wherein the executable instructions stored on the memory comprise all of said control instructions, said one or more processors being configured to execute said control instructions for rendering said 3-D image comprise said one or more processors being configured to:
execute control instructions for forming, from each said mask, a 2-D mesh, and
execute control instructions for converting each said 2-D mesh into a 3-D planar mesh.

22. The system of claim 21, wherein said one or more processors being configured to execute said control instructions for converting each said 2-D mesh comprise said one or more processors being configured to execute control instructions for reverse projection.

23. The system of claim 21, wherein said one or more processors are further configured to:
execute control instructions for forming a 3-D mesh from said planar mesh.

24. The system of claim 23, wherein said one or more processors are configured to execute control instructions to construct said 2-D mesh using vertices, and wherein said one or more processors being configured to execute control instructions for forming a 2-D mesh comprise said one or more processors being configured to:
execute control instructions for lofting by replicating surface vertices of said 2-D mesh.

25. The system of claim 19, wherein the executable instructions stored on the memory comprise all of said control instructions, said one or more processors being configured to execute control instructions for generating a plurality of segmentation layer masks comprise said one or more processors being configured to execute control instructions for generating said plurality of segmentation layer masks using polycurve techniques.

* * * * *